US005500501A

United States Patent [19]

Lynum et al.

[11] Patent Number: 5,500,501

[45] Date of Patent: Mar. 19, 1996

[54] TORCH DEVICE FOR CHEMICAL PROCESSES

[75] Inventors: Steinar Lynum; Kjell Haugsten, both of Oslo; Ketil Hox, Trondheim; Jan Hugdahl, Trondheim; Nils Myklebust, Trondheim, all of Norway

[73] Assignee: Kvaerner Engineering A.S., Lysaker, Norway

[21] Appl. No.: 244,300

[22] PCT Filed: Dec. 11, 1992

[86] PCT No.: PCT/NO92/00199

§ 371 Date: Jan. 10, 1995

§ 102(e) Date: Jan. 10, 1995

[87] PCT Pub. No.: WO93/12635

PCT Pub. Date: Jun. 24, 1993

[30] Foreign Application Priority Data

Dec. 12, 1991 [NO] Norway .................................... 914910

[51] Int. Cl.$^6$ .................................................... B23K 10/00

[52] U.S. Cl. ............... 219/121.48; 219/123; 219/121.52; 219/121.49

[58] Field of Search ......................... 219/121.48, 121.52, 219/123, 75, 121.59, 121.36, 121.49; 313/231.21, 231.31

[56] References Cited

U.S. PATENT DOCUMENTS 4,390,772 6/1983 Hiratake .

FOREIGN PATENT DOCUMENTS 2913464 10/1980 Germany .

OTHER PUBLICATIONS

Derwent's abstract, No. 59–D5084B/16 week 5916 Abstract of SU, A1 609217 (Korshakovskii S I), 30 May 1978.

*Primary Examiner*—Mark H. Paschall
*Attorney, Agent, or Firm*—Cushman Darby & Cushman

[57] ABSTRACT

A plasma torch includes an arc having a generator for producing an axial field in the arc's area of operation in which one or more bodies of ferromagnetic material are placed along the torches central axis; the body is in the form of an element incorporated in the torch and is cooled by the provision of channels for a cooling medium wherein the ferromagnetic body is located near the arc's area of operation to reinforce the magnetic field with the body being moveable in an axial direction to adjust the operation parameters of the arc.

3 Claims, 2 Drawing Sheets

TORCH DEVICE FOR CHEMICAL PROCESSES

FIELD OF THE INVENTION

The invention concerns a plasma torch device equipped with an axial magnetic field in order to rotate the arc around the torch's centre axis.

BACKGROUND OF THE INVENTION

Plasma torches are mainly designed according to two principles. In one embodiment two or more tube electrodes are used located coaxially outside one another. In a second embodiment two or more tube electrodes are used wherein the electrodes are located coaxially opposite one another. The electrodes are connected to an electrical power supply and can be supplied with either alternating current or direct current. Gas is supplied to the torch, usually through or between the electrodes. A high-temperature plasma is formed by means of the gas which is heated by the electric arc which extends between the electrodes.

There are known plasma torches equipped with a magnetic field. From German patent DE 1 300 182 there is known a plasma torch with two tube electrodes located coaxially outside each other. A coil to which direct current is supplied is placed around the external electrode. It produces an axial magnetic field in the torch which causes the arc to rotate around the torch's centre axis.

The patent also describes a plasma torch with two tube electrodes located coaxially opposite each other. A coil is located in each of the hollow electrodes producing a magnetic field which causes the arc to rotate.

From U.S. Pat. No. 4 390 772 is known a plasma torch device where the magnetic field generated by a magnetic field generator is conducted to the arc's area of operation through a body formed from a magnetic material provided with cooling channels. The plasma arc is thus forced to rotate. In plasma torches not only the rotation of the plasma arc is of importance but also the ability to make adjustments to the magnetic field in the arc's area of operation to keep the arc in correct position in relation to the end faces of the electrodes. However, this feature is not disclosed in this patent.

From DE 2 913 464 is known a plasma torch device with two electrodes located coaxially opposite each other. A coil is placed around the torch body and generates an axial magnetic field in the plasma zone. By moving either the coil or the movable electrode the length of the arc can be adjusted. In the arc's area of operation a ferromagnetic body will reinforce the field and have a much greater effect on the adjustment of the arc. However, this feature is not disclosed in the patent.

The object of the magnetic field is primarily to provide an electromagnetic force to act on the arc, causing it to rotate around the torch's centre axis, thereby obtaining even wear around the torch and maintaining an even rotational symmetry in the actual electrodes. When the arc rotates sufficiently rapidly, moreover, the maximum temperature of the arc's foot points decreases, thereby reducing the speed of evaporation of the electrode material, or in other words the wear and tear. In consequence, the power load on the electrodes can be increased. Plasma torches which utilize a magnetic field are provided with one or more annular coils or with one or more annular permanent magnets. Such a coil or magnet is usually located around the electrodes and preferably in the area of the torch where the arc is formed or close to this area. The axis of the coil or permanent magnet is normally coincident with the electrodes' centre axis.

When a coil is supplied with direct current, a rotationally symmetrical magnetic field is created around it. In the coil cross section the field is axially and approximately constant. It is deflected towards the ends of the coil, and at the end surfaces the field intensity is reduced in relation to the value in the middle of the coil. Outside the coil's end surfaces the field intensity drops rapidly and is already reduced to only a small percentage of the value in the middle of the coil at a short distance from the ends.

In a coil cross section live conductors and bodies located there will affect this magnetic field. In particular bodies of ferromagnetic material will affect the magnetic field, causing it to assume a completely different form and character from those it had originally.

For financial, practical and technical reasons it is advantageous in a plasma torch to obtain the strongest possible field in the vicinity of the torch axis where the arc operates with the smallest possible coil dimension. A proposed solution is to place a coil inside the hollow electrodes in order to bring it as close as possible to the torch axis, thus producing the strongest possible field in the area of the arc. However, such coils cannot be located in solid electrodes. In hollow electrodes which are not consumable and thus require cooling, it is difficult to place a sufficiently large coil without reducing the through-flow of a cooling medium. Thus coils located in hollow electrodes have not achieved any practical application.

SUMMARY OF THE INVENTION

The object of the present invention is to provide a device which will attain the strongest possible field in the arc's area of operation. And by varying the axial position of the device the field can be reinforced both in strength and direction in the arc's area of operation.

This is achieved by a device which is characterized by the features in the patent claims presented.

By placing one or more bodies which are composed of a ferromagnetic material in or along the centre axis of a torch, there will be an increase in the strength of the magnetic field or flux density outside the ends of this or these ferromagnetic bodies. When one or more such bodies are placed in such a manner that they extend from an area with a preferably constant magnetic field and one of its end surfaces is close to the area where the arc operates, a field concentration is obtained in this area. It has been shown that with a correctly placed body, the field in the arc zone can be intensified locally in the order of 10 times or more.

Such a body can have a variety of forms. It can be designed as a rod-shaped body with arbitrary shape or as a tubular body.

The body can be designed as a part of an element which forms an integral part of a plasma torch and which extends towards the plasma zone. This could entail design in the form of a wall in electrodes or as a part of electrodes and as one or more walls in electrode holders. The body can also be designed in the form of one or more walls or dividing plates in cooling channels or cooling tubes, or as one or more walls or a dividing plate in a supply pipe for admixtures.

All types of ferromagnetic materials can be used for such a body, e.g. steel, nickel, cobolt or alloys of these. Materials with a high constant of permeability are of particular interest. Cermets with special magnetic properties can also be used.

A ferromagnetic body of this kind will normally be cooled by providing channels for a cooling medium or it can be located close to other cooled elements in the torch. It can also be integrated in an element which is cooled in a plasma torch, one or more parts of this element consisting of a ferromagnetic material.

The length of the body is preferably adapted to allow it to extend from an area where there is the strongest axial magnetic field, for example from the centre of a coil, to the arc's area of operation. It is advantageous for the length of the body to be adapted to the coil which creates the magnetic field in such a way that it is at least the same length as the coil and extends from one end of the coil to the arc's area of operation. When the body is designed as an element or part of an element which forms a part of a plasma torch, the length of the body can be the length of the element.

By varying the dimensions and the axial position of such a ferromagnetic body, the field can be reinforced both in strength and direction in the arc's area of operation. This is one of the advantages of the present invention.

The effect of a radial component in the magnetic field is that, together with tangential components of the electric current, it provides a force to the arc which acts in the torch's longitudinal direction. With the correct combination of current direction and direction of the field's radial component, this force will help to keep the arc in the axial position at the end of the lance. A body composed of ferromagnetic material will affect the field in both size and direction, a fact which is exploited in the present invention.

In a plasma torch designed for chemical reactions of gases, the combination of the arc's axial stabilizing and rotational velocity will provide optimum conditions for the chemical processes. This combination can be achieved when the ferromagnetic body is in the correct position in relation to the end faces of the electrode.

It is known that the magnetic field can also be conducted to the arc zone. For practical reasons it can be difficult to place a coil around the arc's area of operation, for example if the arc zone is located in a reaction chamber. In that case, in order to create a desired magnetic field of sufficient strength, a coil of large dimensions would have to be used. In such a case a coil can be placed around the torch's electrodes in the normal manner. A ferromagnetic body placed along the centre axis of the torch will conduct the magnetic field from the area encompassed by the coil to the arc's area of operation. At the end of the coil the magnetic field is rapidly deflected and therefore without this body the field in the arc zone would be of a very low intensity.

Within the scope of the invention many different designs of bodies composed of a ferromagnetic material can be applied, and the invention can be used for many different types of plasma torch, such as a plasma torch described in the applicant's Norwegian patent application no. 91 4907.

BRIEF DESCRIPTION OF THE DRAWINGS

In the following section the invention will be described in more detail with reference to drawings which schematically illustrate some embodiments of ferromagnetic bodies located in a plasma torch.

DETAILED DESCRIPTION OF THE INVENTION

Figure 1:
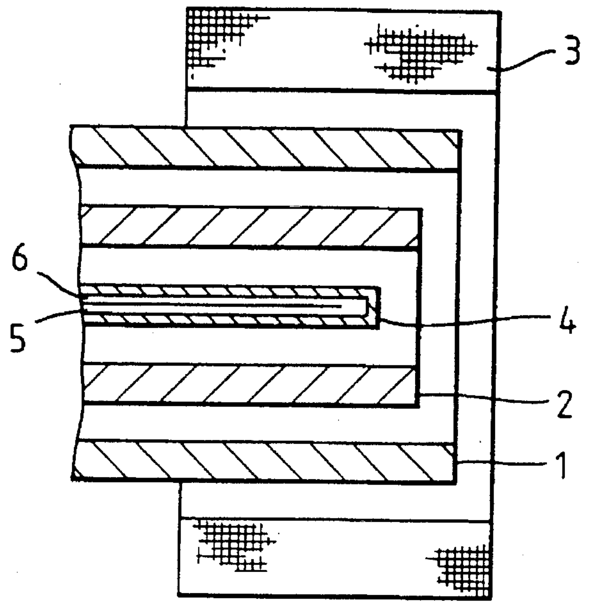
FIGS. 1, 2, 3 and 4 are vertical sections through plasma torches according to the present invention.

The plasma torch illustrated in FIG. 1 is provided with an exterior electrode land a central electrode 2. The electrodes are annular in shape and are located coaxially inside each other. The electrodes are solid and can be consumable. Cooled electrodes can also be used. Around the electrodes in the arc's area of operation there is placed an annular coil 3. In the coil cross section there is created an axial magnetic field. A rod-shaped body 4, preferably cylindrical in shape, which is composed of a ferromagnetic material, is placed along the torch axis. The body 4 is provided with cooling channels 5, 6, for transport of a cooling medium when this is necessary. The body 4 will concentrate the magnetic field in such a way that the strongest possible field is obtained in the arc's area of operation.

Figure 2:
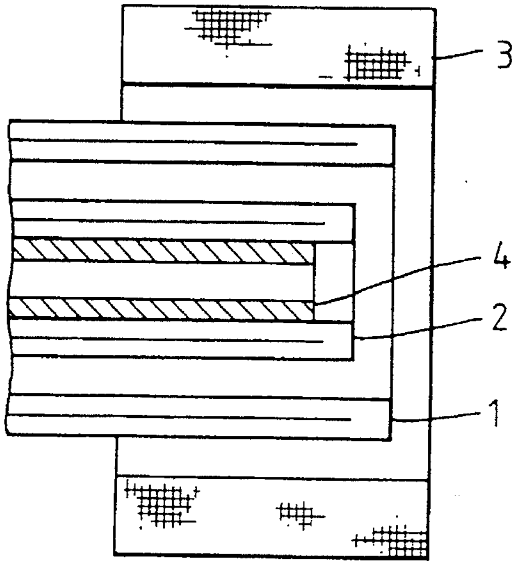

The plasma torch illustrated in FIG. 2 is provided with an exterior electrode 1 and a central electrode 2. The electrodes are annular in shape and are located coaxially inside each other. The electrodes are cooled by the provision of dividing plates, thus forming channels for the transport of a cooling medium. Around the electrodes there is placed an annular coil 3. In the coil's cross section an axial magnetic field is created. An annular body 4 which is composed of a ferromagnetic material is placed in contact with the interior cooled wall of the central electrode 2. The body 4 can also be provided as an interior wall or a part of the interior wall of the central electrode 2, this wall or a part of it being composed of a ferromagnetic material. The body 4 will concentrate the magnetic field so that the strongest possible field is obtained in the arc's area of operation.

Figure 3:
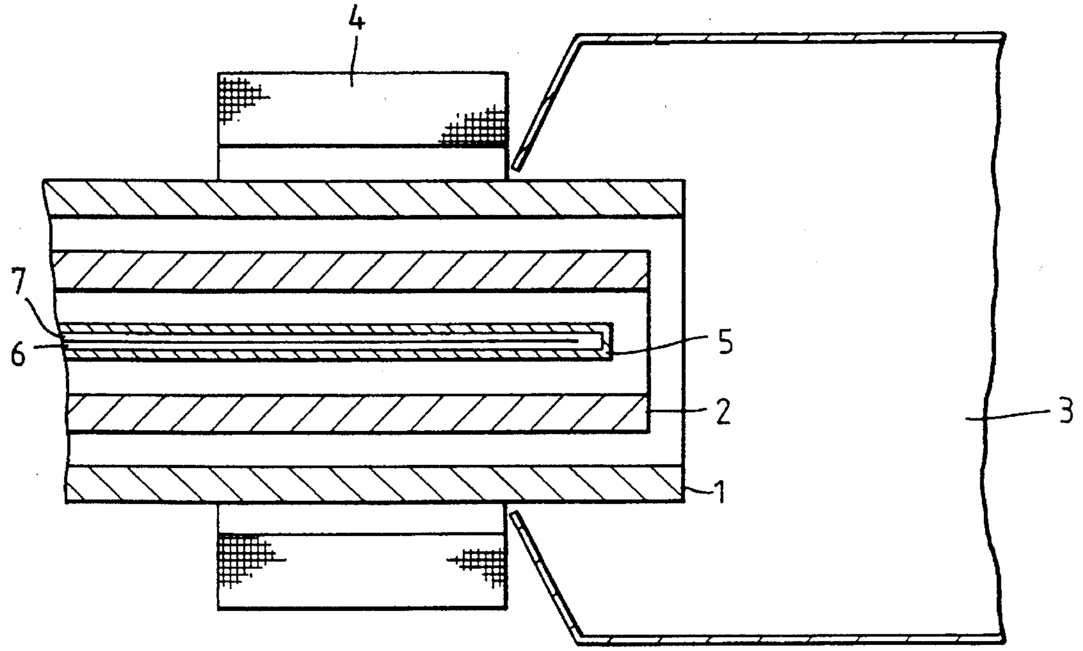

The plasma torch illustrated in FIG. 3 is provided with an exterior electrode 1 and a central electrode 2. The electrodes are annular in shape and are located coaxially inside each other. The electrodes are solid and can be consumable. Cooled electrodes can also be used. The electrodes project into a space 3 to which heat is supplied, for example a reaction chamber. Around the electrodes is placed an annular coil 4. In the coil cross section an axial magnetic field is created.

In some cases the walls in the space 3 can be composed of a ferromagnetic material. In other cases the dimensions of the space 3 can make it difficult to place a magnetic coil around the arc's area of operation. A body 5, preferably cylindrical in shape and composed of a ferromagnetic material, is placed along the torch axis. It is provided with cooling channels 6, 7 when this is necessary. The body 5 preferably extends from the area below the coil to the arc zone in the torch. It will conduct the magnetic field from an area with a stronger axial field to the arc's area of operation. This feature is, however, known from U.S. Pat. No. 4 390 772.

Figure 4:
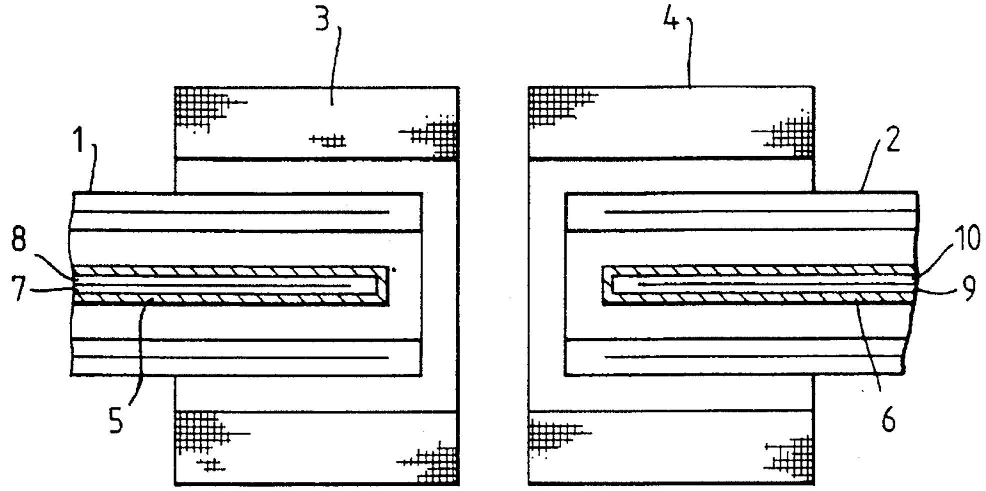

The plasma torch illustrated in FIG. 4 is provided with two electrodes which can be designated the left electrode 1 and the right electrode 2. The electrodes are annular in shape and are located coaxially opposite each other. The electrodes are preferably cooled by providing them with dividing plates, thus forming channels for the transport of a cooling medium. Solid electrodes can also be used. Around the electrodes in the arc's area of operation there are placed annular coils 3 and 4. An axial magnetic field is created in the coils' cross section. In each of the electrodes 1 and 2 there are located preferably cylindrical shaped bodies 5 and 6. They are composed of a ferromagnetic material and are placed along the axes of the electrodes. The bodies 5 and 6 are provided with channels 7, 8, 9 and 10 for the transport of a cooling medium. One end of the bodies 5 and 6 is located close to the arc's area of operation and will concentrate the magnetic field in order to obtain the strongest possible field in this area.

We claim:

1. A plasma torch device comprising hollow bodies which are generally concentric about a central axis and defining respectively anode and cathode elements, an axial-magnetic field generator, said bodies having operating ends, surrounded by said field generator, which are open and which generate an arc during the operation of the plasma torch device, another body of ferromagnetic material in the form of a hollow rod located along said central axis and including cooling channels for a cooling medium, said ferromagnetic body being moveable along said axis to adjust the operation parameters of said arc.

2. The invention as claimed in claim 1 wherein said cathode and anode bodies are each hollow cylindrical members having cooling paths formed interiorally thereof.

3. The invention as claimed in claims 1 or 2 wherein said ferromagnetic body is a hollow tube having a closed end adjacent said operating ends of said anode and cathode elements.

* * * * *